United States Patent [19]

Fukui

[11] Patent Number: 4,905,186

[45] Date of Patent: Feb. 27, 1990

[54] PORTABLE DATA TERMINAL

[75] Inventor: Takao Fukui, Nara, Japan

[73] Assignee: Sharp Kabushiki Kaisha

[21] Appl. No.: 382,054

[22] Filed: Jul. 13, 1989

Related U.S. Application Data

[63] Continuation of Ser. No. 220,943, Jun. 27, 1988, abandoned, which is a continuation of Ser. No. 481,984, Apr. 4, 1983, abandoned.

[30] Foreign Application Priority Data

Apr. 6, 1982 [JP] Japan .................................. 57-58619
Apr. 7, 1982 [JP] Japan .................................. 57-58759

[51] Int. Cl.⁴ ............................................ G06F 15/30
[52] U.S. Cl. .................................. 364/900; 364/918.1; 364/927; 364/928; 364/933.9
[58] Field of Search ................ 364/900 MS File, 401, 364/406, 408

[56] References Cited

U.S. PATENT DOCUMENTS 4,277,837 7/1981 Stuckert ............................. 364/900
4,319,336 3/1982 Anderson et al. .................. 364/900
4,433,387 2/1984 Dyer et al. .......................... 364/900
4,509,138 4/1985 Hayashi et al. ..................... 364/900

OTHER PUBLICATIONS

Williams et al., "The Panasonic and Quasar Hand-Held Computers", Jan. 1981, pp. 34–45, Byte Publications, Inc.

Primary Examiner—Thomas M. Heckler
Attorney, Agent, or Firm—Birch, Stewart, Kolasch & Birch

[57] ABSTRACT

A portable data terminal unit includes a data RAM for storing transaction data, and an acoustic coupler for transmitting the data stored in the data RAM to a computer installed in a business office. The portable data terminal unit has a battery for power supply purposes. The acoustic coupler is connected to the battery at a desired time for data transmission purposes. The data RAM is continuously connected to the battery for maintaining the transaction data stored in the data RAM. The present portable data terminal unit is suited for money collecting operations related to the insurance business and the installment savings business.

1 Claim, 5 Drawing Sheets

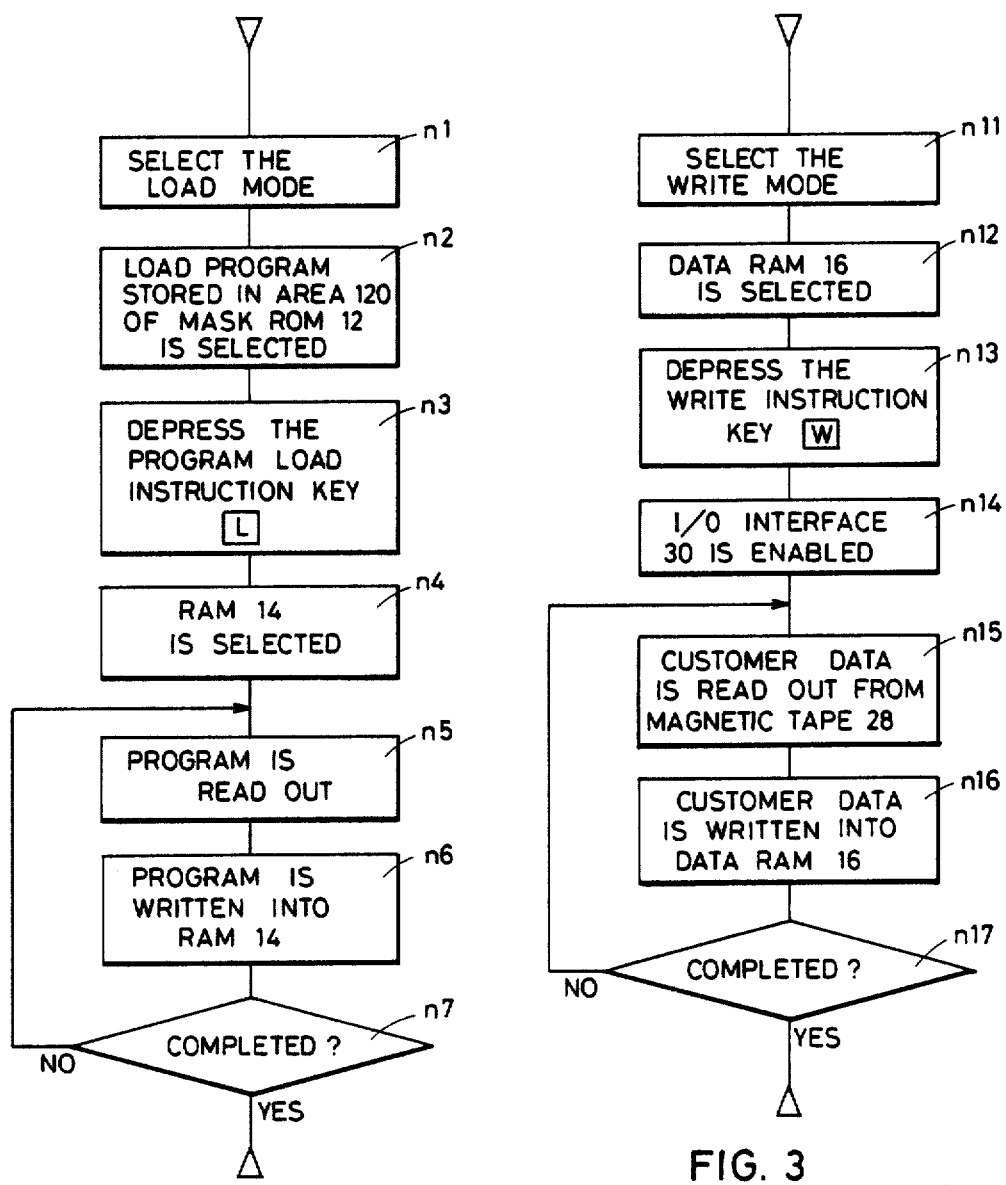

( MONEY COLLECTION REGISTERING )

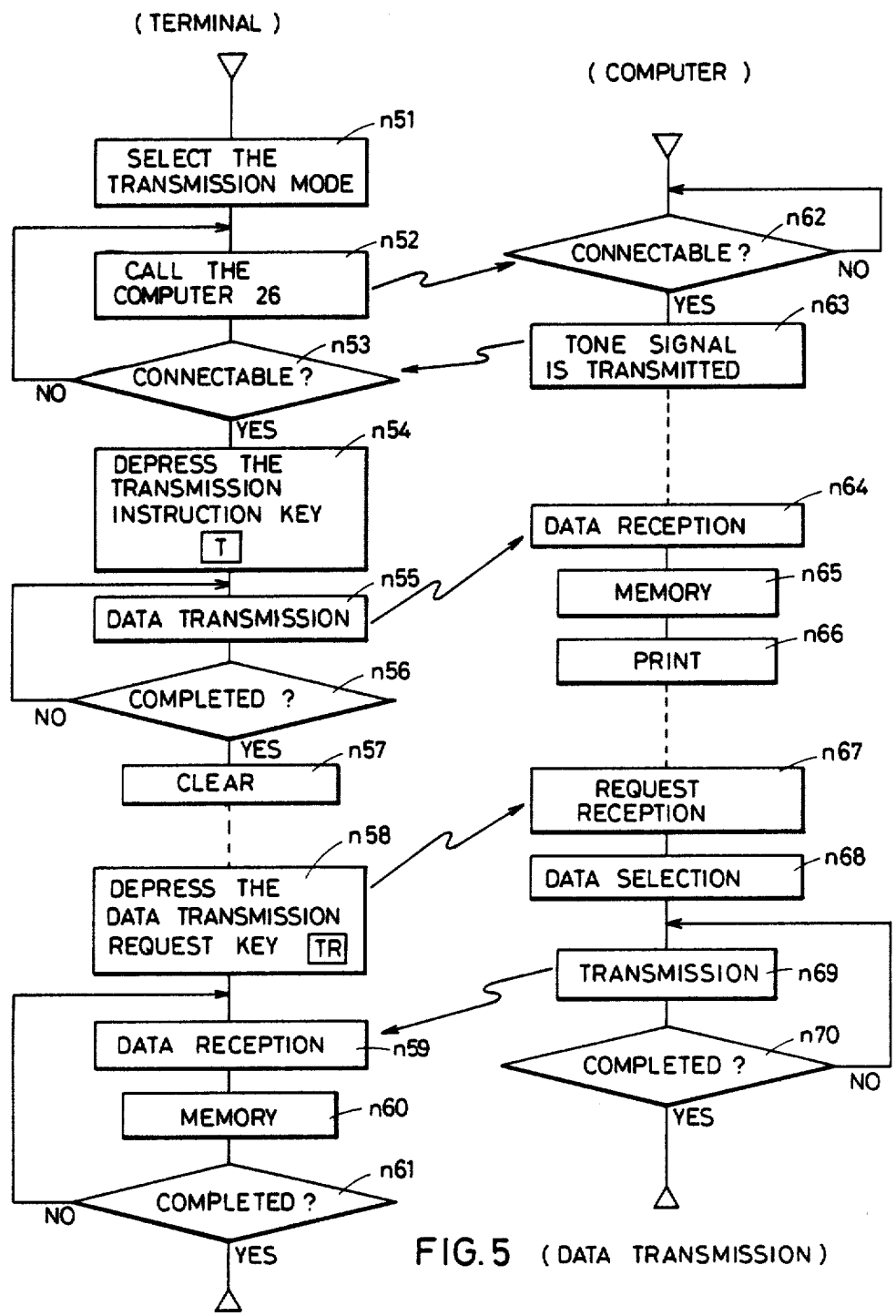
FIG.5 (DATA TRANSMISSION)

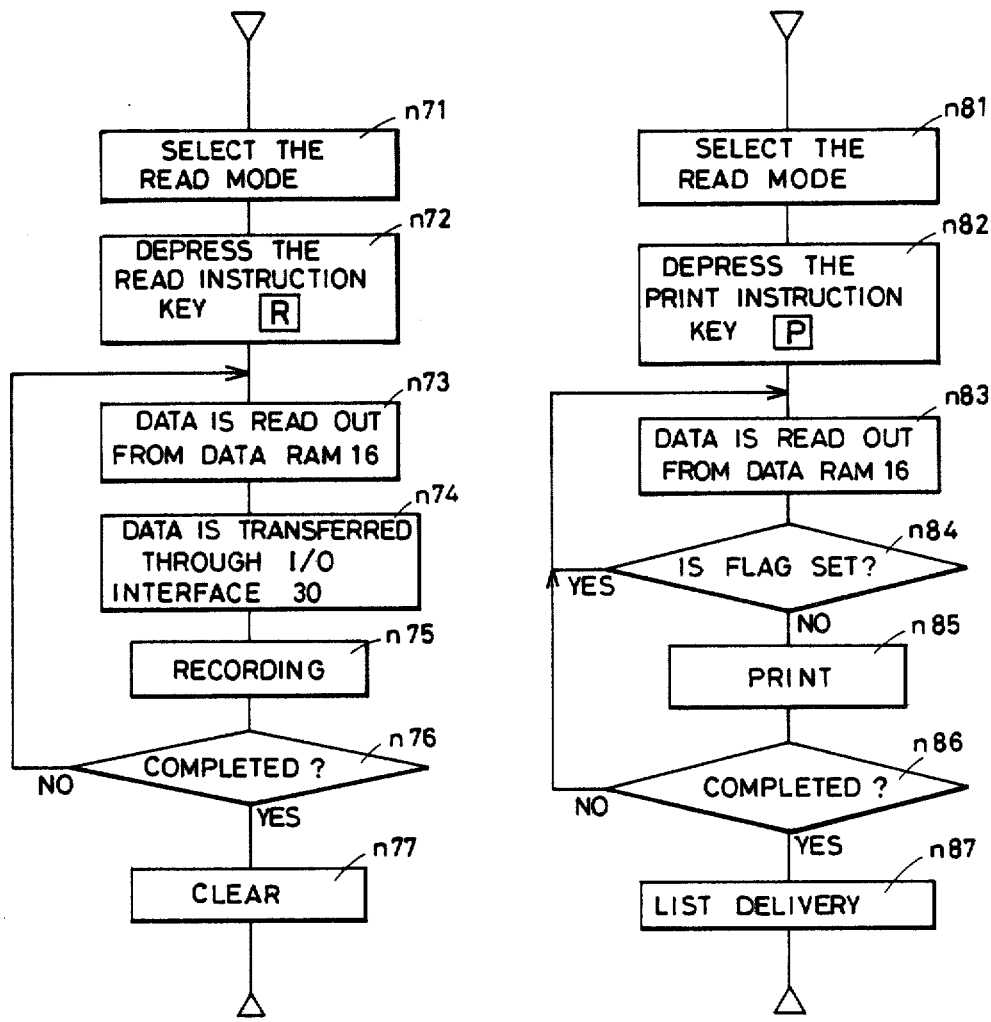
FIG. 6 (DATA RECORDING)
FIG. 7 (DELIVERY OF LIST OF PENDING CUSTOMERS)

PORTABLE DATA TERMINAL

This application is a continuation of application Ser. No. 07/220,943 filed on June 27, 1988, which is a continuation, of application Ser. No. 481,984 filed on Apr. 4, 1983, both now abandoned.

BACKGROUND AND SUMMARY OF THE INVENTION

The present invention relates to a portable data terminal which can communicate with a computer through a telephone network.

In the money collecting operation of an insurance business or an installment savings business, the canvasser visits the customers in accordance with a customer list produced by a main computer at the central business office. The canvasser receives the money, delivers the receipt, and totals the money collected for each customer. The collected money data must then be written into a main computer after the canvasser returns to the business office to update the customer's account to conform with the collection.

Currently, a large part of the entire operation is manually conducted by the canvasser. This greatly reduces the reliability of the collection system even though a main computer is installed in the business office to maintain customer accounts.

Accordingly, an object of the present invention is to provide a portable data terminal which is suited for the money collecting operation related to the insurance business and the installment savings business.

Accordingly, an object of the present invention is to provide a portable data terminal powered by a battery and connectable to a computer via a telephone network to provide the canvasser with access to the main computer for processing and receiving customer data without the need to return to the business office.

Other objects and further scope of applicability of the present invention will become apparent from the detailed description given hereinafter. It should be understood that the detailed description and specific examples, while indicating preferred embodiments of the invention, are given by way of illustration only since various changes and modifications within the spirit and scope of the invention will become apparent to those skilled in the art from this detailed description.

To achieve the above objects, pursuant to an embodiment of the present invention, a portable data terminal is provided, which includes a memory system for storing customer data and application program introduced from various input sources and a coupler for transmitting the data stored in the memory system to a computer installed in the business office via a telephone network at a desired time. The portable data terminal of the present invention is powered by a battery to maintain data contained in the memory system even when the main power switch is switched off.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 2 is a flow chart for explaining a program load operation conducted by the portable data terminal of FIG. 1;

FIG. 3 is a flow chart for explaining a customer data writing operation conducted by the portable data terminal of FIG. 1;

FIG. 5 is a flow chart for explaining a data transmitting operation conducted by the portable data terminal of FIG. 1;

FIG. 6 is a flow chart for explaining a data recording operation conducted by the portable data terminal of FIG. 1; and FIG. 7 is a flow chart for explaining a customer list printing operation conducted by the portable data terminal of FIG. 1.

DESCRIPTION OF THE PREFERRED EMBODIMENTS

Figure 1:
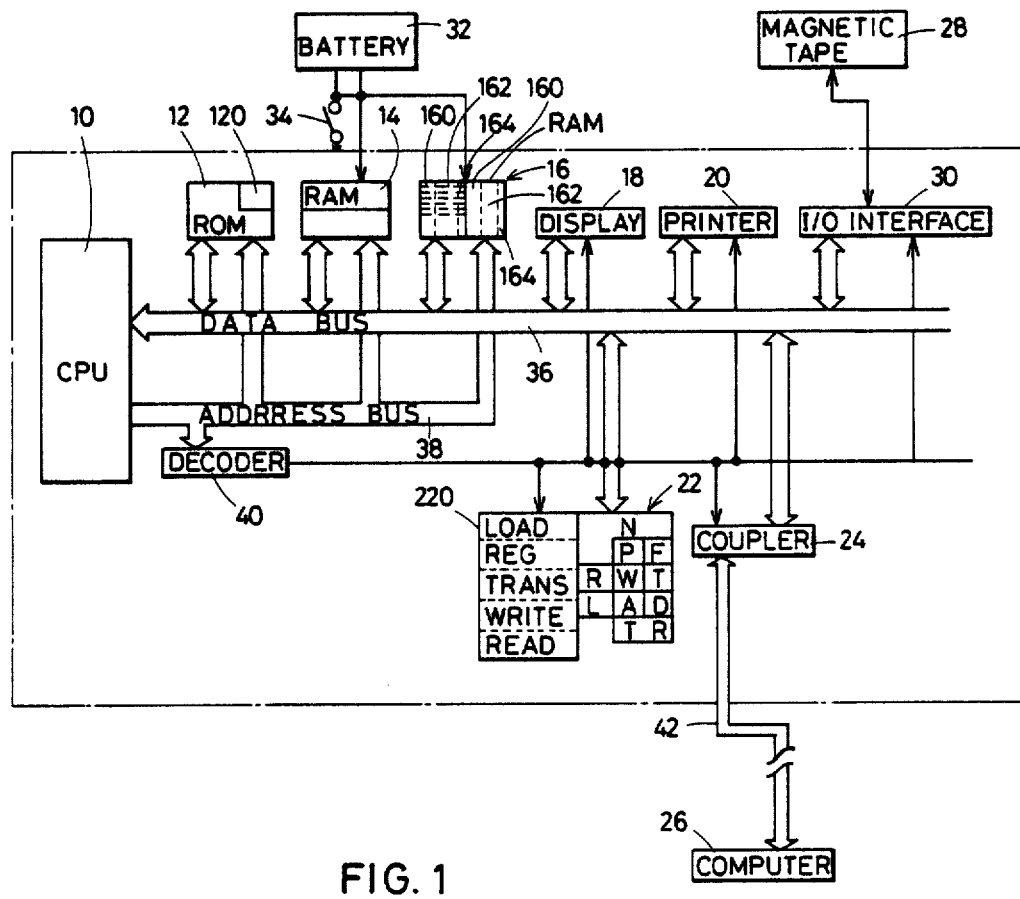
FIG. 1 is a block diagram of an embodiment of a portable data terminal of the present invention.

An embodiment of a portable data terminal of the present invention is shown in FIG. 1, which includes a central processor unit (CPU) 10 for controlling the system operation, and a read only memory (mask ROM) 12 for storing a basic program for controlling the operation of the portable data terminal. A first random access memory (RAM) 14 is provided for storing an application program according to which the portable data terminal performs a specific operation, and a second random access memory (data RAM) 16 is provided for storing inputted data. The inputted data is displayed on a display panel 18 and printed on a receipt slip by a printer 20. A keyboard panel 22 is provided for introducing various data through the use of numeral keys N, and various instructions through the use of function keys and mode selection keys 220.

The data stored in the data RAM 16 is transmitted to a computer 26 installed in the business office via an acoustic coupler 24 and a public telephone network 42. A magnetic tape unit 28 is connectable to the portable data terminal in order to write an application program into the RAM 14 via an input/output (I/O) interface 30. The CPU 10 is connected to the ROM 12, the RAM 14, the data RAM 16, the display 18, the printer 20, the keyboard panel 22, the coupler 24, and the I/O interface 30 via a data bus 36 and/or an address bus 38.

The portable data terminal of FIG. 1 further includes a decoder 40 for decoding the address information developed on the address bus 38, thereby selecting a desired element. A battery 32 and a main power switch 34 are provided for energizing the portable data terminal. The RAM 14 and the data RAM 16 are directly connected to the battery 32 so that the RAM 14 and the data RAM 16 receive power even when the main power switch 34 is switched off, thereby maintaining the data stored in the RAM 14 and data RAM 16.

The ROM 12 includes an area 120 which stores a load program according to which the application program is written from the magnetic tape unit 28 to the RAM 14. The data RAM 16 includes a first area 160 for storing the customer code or the customer name, a second area 162 for storing a data related to the collected money, and a third area 164 for storing a flag which indicates the completion of the money collecting operation.

The mode selection keys 220 include a load mode key LOAD, a registering mode key REG, a transmitting mode key TRANS, a write mode key write, and a read mode key READ. The keyboard panel 22 includes the numeral keys N, and the function keys such as a read instruction key R, a write instruction key W, a transmission instruction key T, a program load instruction key L, a customer code (name) key A, a data input key D, a money collection completion indicating key F, a data transmission request key TR, and a print instruction key P.

Operational modes of the portable data terminal of the present invention will be described with reference to FIGS. 2 through 7.

Loading Of An Application Program

FIG. 2 shows an operation mode in which an application program designed for a money collecting operation is written from the magnetic tape unit 28 into the RAM 14.

First, the load mode key LOAD included in the mode selection keys 220 is actuated (step n1) to place the portable data terminal in the load mode. The magnetic tape unit 28 storing a desired application program, that is, the money collecting application program, is electrically connected to the I/O interface 30. In response to the actuation of the load mode key LOAD, the CPU 10 selects the load program stored in the area 120 of the mask ROM 12 (step n2).

Then, the operator depresses the program load instruction key L included in the keyboard panel 22 (step n3). In response thereto, the first RAM 14 is selected (step n4) to receive the money collecting program read out from the magnetic tape unit 28 (steps n5, n6 and n7). The introduced application program is maintained in the RAM 14 even when the main power switch 34 is switched off, as already discussed above.

Writing Of Customer Data

FIG. 3 shows a customer data writing mode in which the customer data is written into the data RAM 16 via the I/O interface 30.

After the application program has been written into the first RAM 14, the customer data is written into the data RAM 16 before the canvasser visits the customers. First, the write mode key WRITE included in the mode selection keys 220 is actuated (step n11). In response to the actuation of the write mode key WRITE, the CPU 10 selects the data RAM 16 (step n12) to receive the customer data. Then, the operator depresses the write instruction key W included in the keyboard panel 22 (step n13) to select the I/O interface 30 through the CPU 10 (step N14). Customer data such as the customer code and the customer's current balance is collectively stored in the magnetic tape unit 28 and written into the data RAM 16 through the I/O interface 30 (steps n15, n16 and n17). The customer code is written into the first area 160 and the customer balance is written into the second area 162. The thus introduced customer data stored in the data RAM 16 does not disappear even when the main power switch 34 is switched off, as already discussed above.

Registering Of Collected Money

Figure 4:
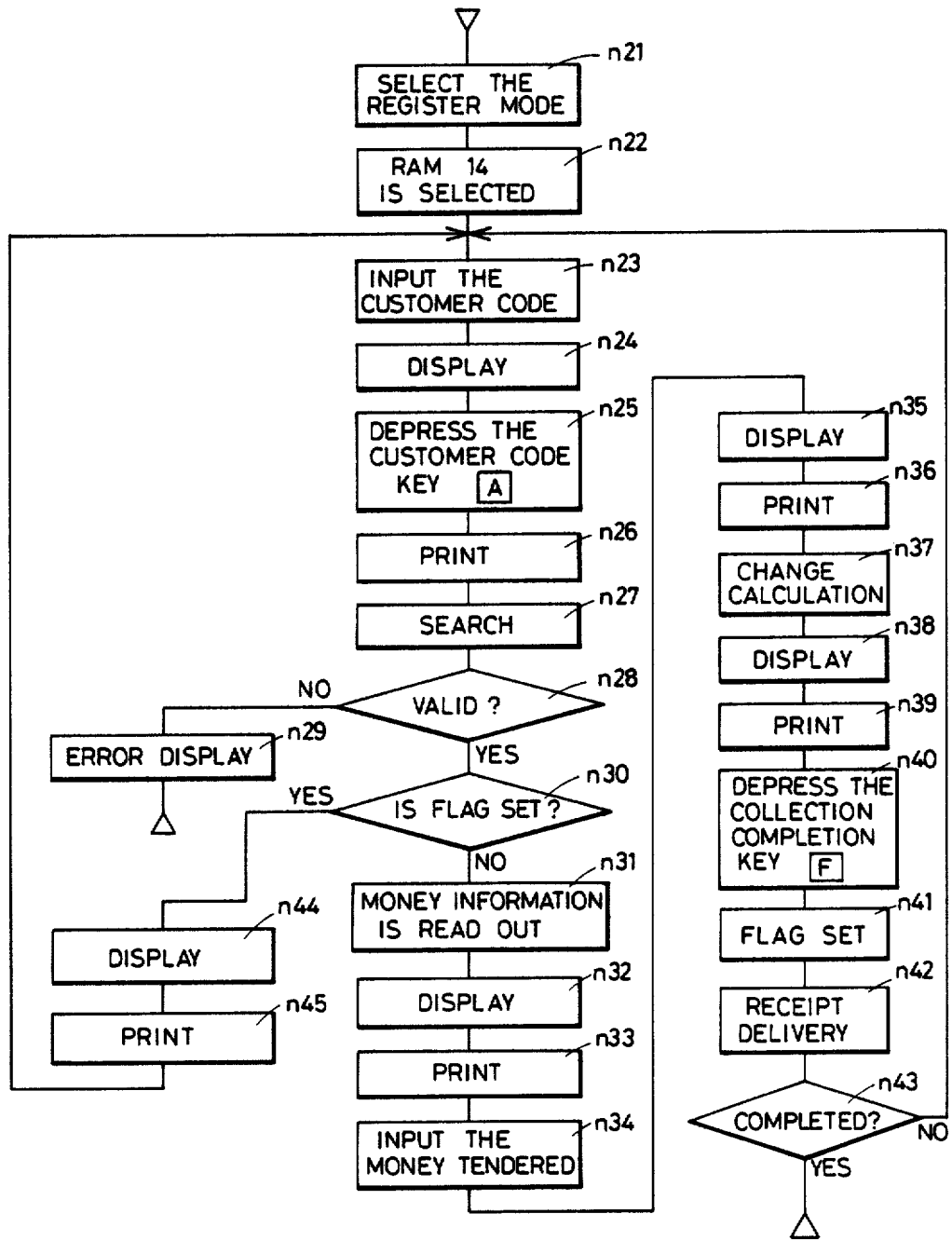
FIG. 4 is a flow chart for explaining a data registering operation conducted by the portable data terminal of FIG. 1.

FIG. 4 shows an operation whereby the canvasser registers the collected money after he receives payment from the customer.

When the customer data has been written into the data RAM 16 in a manner as discussed above, the canvasser visits the customer with the portable data terminal for money collecting purposes. Upon receipt of payment by the canvasser, the registering mode key REG included in the mode selection keys 220 is actuated to place the portable data terminal in the registering mode (step n21). In response to the actuation of the registering mode key REG, the CPU 10 selects the registering operation program stored in the first RAM 14 (step n22). Thereafter, the registering operation is performed.

First, the customer code is introduced through the use of the numeral keys N included in the keyboard panel 22 and the customer code key A is actuated (steps n23, n24, n25 and n26). In response thereto, the CPU 10 conducts a search operation to determine whether the introduced customer code is memorized in the first area 160 of the data RAM 16 (step n27). If the introduced customer code is not found in the first area 160, an error display is conducted on the display panel 18 (steps n28 and n29). When the introduced customer code is found in the first area 160, the CPU 10 checks whether the money collection completion flag is set in the third area 164 at the position corresponding to the introduced customer code (step n30). If the flag is set, a message is displayed on the display panel 18 and printed by the printer 20 to indicate that the money collecting operation has already been conducted in connection with the customer (step n44 and n45).

When the flag is not set in the third area 164, the CPU 10 functions to read out the money which should be collected from the customer, which is stored in the second area 162 (step n31). The balance is displayed on the display panel 18 (step n32) and printed by the printer 20 (step n33). The canvasser reads the display and receives money from the customer. The amount received from the customer is inputted into the CPU 10 through the keyboard panel 22 (steps n34, n35 and n36). Then, the CPU 10 performs the calculation to display and print the customer's balance after the payment (steps n37, n38 and n39). The canvasser reads the change display to deliver the change to the customer. When the money collecting operation is completed, the canvasser depresses the money collection completion indicating key F included in the keyboard panel 22 to inform the CPU 10 of the completion of the money collecting operation in connection with the customer (step n40). In response to the actuation of the money collection completion indicating key F, the CPU 10 functions to set the flag in the third area 164 at the position corresponding to the customer (step n41). Thereafter a receipt slip is developed by the printer 20 (step n42) and the operation is returned to the step n23 (step n43) to register the money collecting operation related to the next customer.

Transmitting Of Registered Data

When the money collecting operation in connection with the customers stored in the data RAM 16 is completed, the registered data is transmitted to the computer 26 installed in the business office, and the canvasser can obtain a new customer data, if desired.

FIG. 5 shows an operational mode where the data stored in the data RAM 16 is transmitted to the computer 26 via the acoustic coupler 24.

The transmitting mode key TRANS is actuated to place the portable data terminal in the transmitting mode (step n51). The canvasser calls up the computer 26 installed in the business office through the use of the public telephone network 42 (step n52). If the computer 26 is in the operative condition (step n62), an enabling tone signal is transmitted from the computer 26 (step n63). The canvasser hears the tone signal (step n53) and positions the telephone receiver on the acoustic coupler 24. Then, the canvasser actuates the transmission instruction key T included in the keyboard panel 22 (step n54). In response, the CPU 10 functions to transmit the data stored in the data RAM 16 to the computer 26 via the public telephone network 42 and the acoustic coupler 24 (step n55). When the data transmitting operation is completed, the registered data stored in the data RAM 16 is cleared (steps n56 and n57). The thus transmitted customer data is received by the computer 26 (step n64), stored in the computer 26 (step n65), and printed out by the computer 26 (step n66).

When the new data related to other customers is required, desired area information is introduced through the use of the numeral keys N and the data transmission request key TR is actuated (step n58). In response to the request, the computer 26 selects the customer data of the requested area (steps n67 and n68), and transmits the customer data to the portable data terminal (steps n69 and n70). The thus transmitted new customer data received by the portable data terminal (step n59), and is memorized in the data RAM 16 (steps n60 and n61). The canvasser can continue the money collecting operation in accordance with the newly received customer data.

Recording Of Registered Data

When the money collecting operation is completed, the canvasser returns to the business office with the portable data terminal. The portable data terminal is connected to the magnetic tape unit 28 via the I/O interface 30 for recording the data memorized in the data RAM 16 into the magnetic tape unit 28.

FIG. 6 shows an operational mode for transferring the customer data stored in the data RAM 16 to the magnetic tape unit 28.

The read mode key READ is actuated to place the portable data terminal in the read mode (step n71). When the operator actuates the read instruction key R (step n72), the CPU 10 functions to read out the data stored in the data RAM 16 (step n73). The customer data is transferred to the magnetic tape unit 28 through the I/O interface 30 and recorded in the magnetic tape unit 28 (steps n74 and n75). When the recording operation is completed, the data RAM 16 is cleared (steps n76 and n77).

Listing Of Pending Customers

The portable data terminal of the present invention can print out a list of pending customers. Pending customers being those customers from whom the money has not yet been received.

FIG. 7 shows an operational mode for printing a list of the pending customers by the portable data terminal of the present invention.

The read mode key READ included in the mode selection keys 220 is actuated to place the portable data terminal in the read mode (step n81). Then, the print instruction key P is actuated (step n82). In response thereto, the CPU 10 functions to sequentially read out the data stored in the data RAM 16 (step n83) and determine whether the flag is set at the third area 164 (step n84). If the flag is not set at the third area 164, the data corresponding to that customer is printed out by the printer 20 (step n85). The printer 20 produces a complete list of those customers with unsettled accounts.

The invention being thus described, it will be obvious that the same way be varied in many ways. Such variations are not to be regarded as a departure from the spirit and scope of the invention, and all such modifications are intended to be included within the scope of the following claims.

What is claimed is:

1. A system for collecting money from customers on a customer list, said list including customer data inclusive of customer names and associated amounts of money to be collected from each customer, and recording the money amounts collected for each respective customer comprising:

external data source means including a magnetic storage device for storing a portion of said customer list including a selected group of customer names and associated money amounts to be collected from each respective customer, and a main computer for storing the entire said customer list including revised money amounts to be collected for each respective customer; and a plurality of portable data terminals units, each of said plurality of portable data terminal units including, a first random access memory for storing the terminal unit operation program suitable for conducting the money collection operation, a keyboard panel for inputting money data related to the amounts of money collected from each customer and generating function commands for conducting the money collection operation, a second random access memory having first, second, and third memory portions, said first memory portion storing data for the customer names, said second memory portion storing data for the associated money amounts to be collected from each respective customer and said third memory portion storing a flag for indicating when the entire money amount has been collected from each respective customer, means for selectively setting said flag upon payment of the entire money amount, acoustic coupler means for transmitting said data for the customer names and said data for the associated money amounts to said main computer through a public telephone network and for receiving the revised money amounts from the main computer, and central processing unit means for controlling the manipulation of data in said terminal units and bi-directional communication of data between said second random access memory and said main computer through said acoustic coupler means in response to function commands from said keyboard panel.

* * * * *